United States Patent [19]
Lehman

[11] Patent Number: 5,927,390
[45] Date of Patent: Jul. 27, 1999

[54] RADIATOR ARRANGEMENT WITH OFFSET MODULAR CORES

[75] Inventor: David L. Lehman, Metamora, Ill.

[73] Assignee: Caterpillar Inc., Peoria, Ill.

[21] Appl. No.: 08/986,657

[22] Filed: Dec. 8, 1997

Related U.S. Application Data

[60] Provisional application No. 60/032,887, Dec. 13, 1996.
[51] Int. Cl.$^6$ ........................................................ F28D 1/04
[52] U.S. Cl. ............... 165/122; 165/145; 165/DIG. 306; 165/DIG. 310; 165/DIG. 311
[58] Field of Search .................................... 165/122, 124, 165/145

[56] References Cited

U.S. PATENT DOCUMENTS

| | | | |
|---|---|---|---|
| 2,200,442 | 5/1940 | Crawford | ............................ 165/145 X |
| 2,229,266 | 1/1941 | Young | ...................................... 165/145 |
| 2,329,953 | 9/1943 | Staky | ................................... 165/145 X |
| 2,371,501 | 3/1945 | Burkhardt | ............................ 165/145 X |
| 2,869,833 | 1/1959 | Aronson et al. | ..................... 165/145 X |
| 2,995,342 | 8/1961 | Quattrini | .............................. 165/145 X |

*Primary Examiner*—Allen Flanigan
*Attorney, Agent, or Firm*—Alan J. Hickman

[57] ABSTRACT

A modular radiator arrangement having first and second rows of spaced apart radiator core modules and air directing ducts provide a compact radiator arrangement. The air directing ducts are disposed in spaces between adjacent radiator core modules of the first row and about the radiator core modules of the second row located in alignment with the spaces of the first row of radiator core modules provides cooling air flow of substantially the same temperature to each of the first and second rows of radiator core modules.

14 Claims, 2 Drawing Sheets

RADIATOR ARRANGEMENT WITH OFFSET MODULAR CORES

CROSS REFERENCE TO RELATED APPLICATIONS

This application is based, in part, on the material disclosed in U.S. provisional patent application Ser. No. 60/032,887, filed Dec. 13, 1996.

TECHNICAL FIELD

This invention relates to a modular core radiator arrangement and more particularly to a modular core radiator arrangement having two rows of offset modular cores and a plurality of air directing ducts for directing cooling air flow separately through the first and second row of radiator core modules.

BACKGROUND ART

Radiator assemblies having modular radiator cores have been known for some time. Such radiator assemblies have a single row of radiator core modules each having a plurality of spaced apart fins connected to a plurality of tubes which directs circulating coolant flow to and from an internal combustion engine. The size, shape and the number of modular cores is a function of the cooling capacity required for the particular engine. In previous applications, there was substantially no limitations placed on the size of the radiator.

In today's work machine environment, for example, earthworking, material handling, off-highway trucks, paving products and the like, the space available for radiators has been reduced. The reduction in space has reduced the frontal area of the machine to the extent that the capacity of the radiator is no longer sufficient to provide adequate cooling capacity for the internal combustion engine of the machine. The limited size of the frontal area is often dictated by vehicle structures associated with earthworking implement support, operation and the desired lines of sight for the vehicle operator. Because the frontal area cannot be increased, it is necessary to find other ways to increase cooling capacity without increasing the horizontal and vertical dimensions of the radiator.

There have been attempts to increase the surface area of the radiator by arranging the modular cores in a folded v-shape configuration of a single row. Such a configuration has provided additional cooling capacity, however, with the accelerated reduction frontal area space available this too has reached its limits.

The possibility of providing multiple rows of heat exchanger modules has not been considered a feasible option for the reason that air passing through the first row of modules would be preheated by the first row of modules prior to passing through the second row of modules. Such preheating would reduce the amount of heat transfer at the second row. As a result, the efficiency of such an arrangement would be unsatisfactory. Also, the cost of providing a complex system having multiple rows of heat exchanger modules would be relatively high given the reduced efficiency of such a system.

It would be desirable to be able to increase the performance of a modular radiator arrangement by increasing the number of modules and the effective frontal area while maintaining the previous frontal inlet area.

This invention is directed to solving one or more of the above-identified problems.

DISCLOSURE OF THE INVENTION

This invention relates to a modular radiator arrangement for a work machine having a fan for inducing cooling air flow, a plurality of elongated radiator core modules each having a plurality of space substantially parallel fluid passing tubes and a plurality of space substantially parallel fins transversely oriented relative to and connected to the fluid passing tubes. The modular radiator arrangement has a first row of substantially parallel consecutive radiator core modules. The radiator core modules of the first row are spaced apart a predetermined distance and define a first space between consecutive pairs of the modules. A second row of substantially parallel consecutive radiator core modules is also provided. The radiator core modules of the second row are spaced a predetermined distance apart and define a second space between the consecutive pairs of radiator core modules of the second row. The second row of radiator core modules is located a predetermined spaced distance from the first row of radiator core modules and between the fan and the first row of radiator core modules. Each module of the second row of consecutive modules is off set from the modules of the first row of radiator core modules and is aligned with a different first space. A plurality of air directing ducts disposed in the first spaces and about the radiator core modules of the second row of radiator core modules aligned with the first spaces. The air directing ducts direct air flow induced by the fan in bypass of the first row of radiator core modules and through the second row of radiator core modules. The air directing ducts also direct air flow induced by the fan through the first row of radiator core modules and in bypass of the second row of radiator core modules.

BEST MODE FOR CARRYING OUT THE INVENTION

Figure 1:
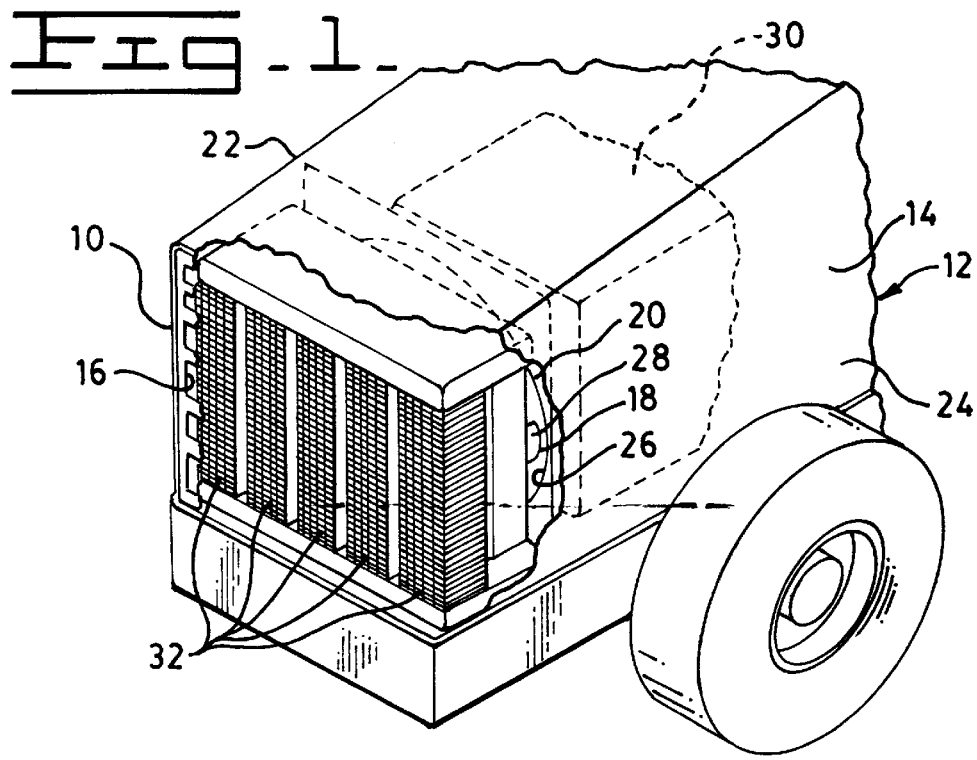
FIG. 1 is a diagrammatic isometric view of an embodiment of the present invention showing a modular radiator arrangement having first and second rows of staggered radiator core modules disposed within a plenum of a work machine.

With reference to the drawings, and particularly FIG. 1, a modular radiator arrangement 10 for a work machine 12, such as a material handling machine, earth-moving machine, off-highway truck, road paving machine, and the like, is shown. The modular radiator arrangement is shown disposed in a plenum 14 of the machine 12. The plenum 14 surrounds the modular radiator arrangement and provides a flowpath for cooling air. The plenum 14 has an opening at one end 16 through which ambient cooling air is drawn. A cooling fan 18 is disposed in the plenum and draws cooling air from the opening 16 and through the modular radiator arrangement 10. The modular radiator arrangement 10 is disposed between the opening 16 and the cooling fan. The cooling fan is shown as an axial type fan, however, other fan configurations such as radial and a combination of radial and axial fan is considered a suitable equivalent and within the scope of the invention.

A shroud 20 is connected to first and second spaced apart side walls 22, 24 of the plenum 14. The shroud may also be connected at top and bottom side walls 23, 25 and connected and between the first and second side walls 22, 24. The shroud has a circular opening 26 of a predetermined diameter disposed therein and provides a predetermined amount of tip clearance with the blades 28 of the cooling fan 18 to maximize air flow. The shroud generally seals at connection to the plenum 14 and causes the cooling air to be drawn through the opening 16, through the modular radiator 10, and through the circular opening 26. An internal combustion engine 30 is disposed in the plenum 14 on a side of the shroud 20 opposite the modular radiator 10. The cooling air flow drawn by the fan is directed by the shroud into the engine area of the plenum 14. It should be recognized that the fan may operate in the reverse direction and force cooling air flow from the engine area or optimally through openings in the walls of the plenum 14 and through the modular radiator. In this mode of operation, the cooling air flow would exit the plenum 14 at the opening 16.

Figure 2:
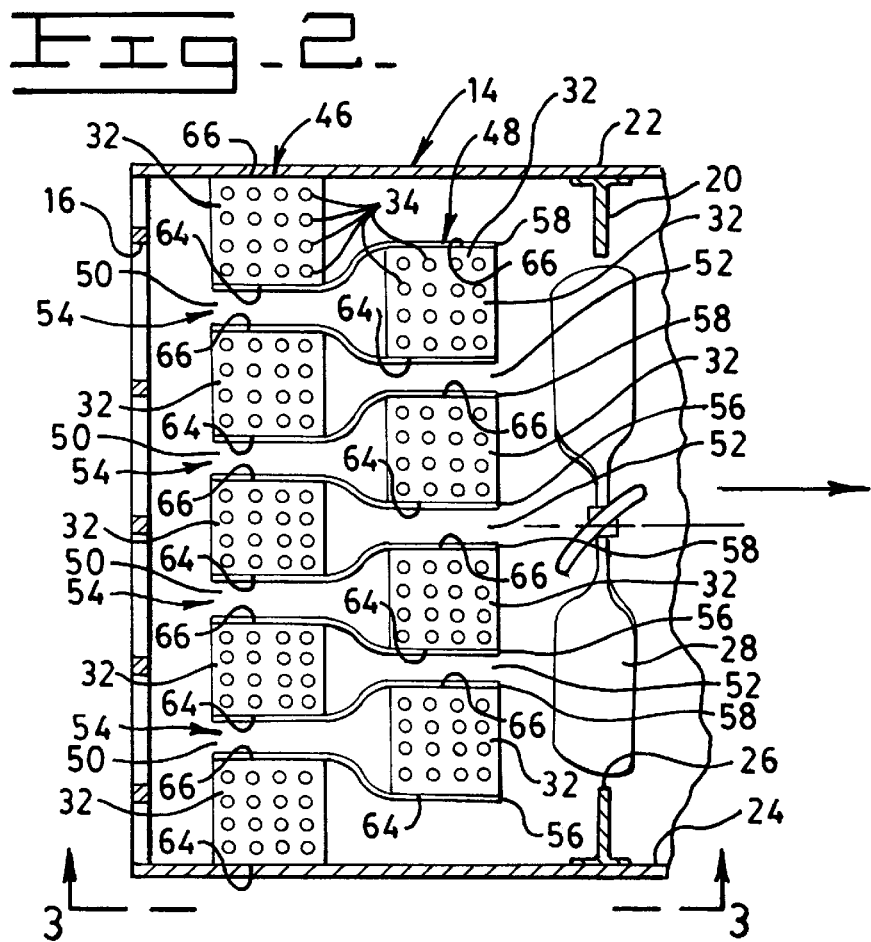
FIG. 2 is a top plan view of the modular radiator arrangement of FIG. 1 showing the first and second rows of staggered radiator core modules disposed in the plenum between an air inlet and an axial fan.
Figure 3:
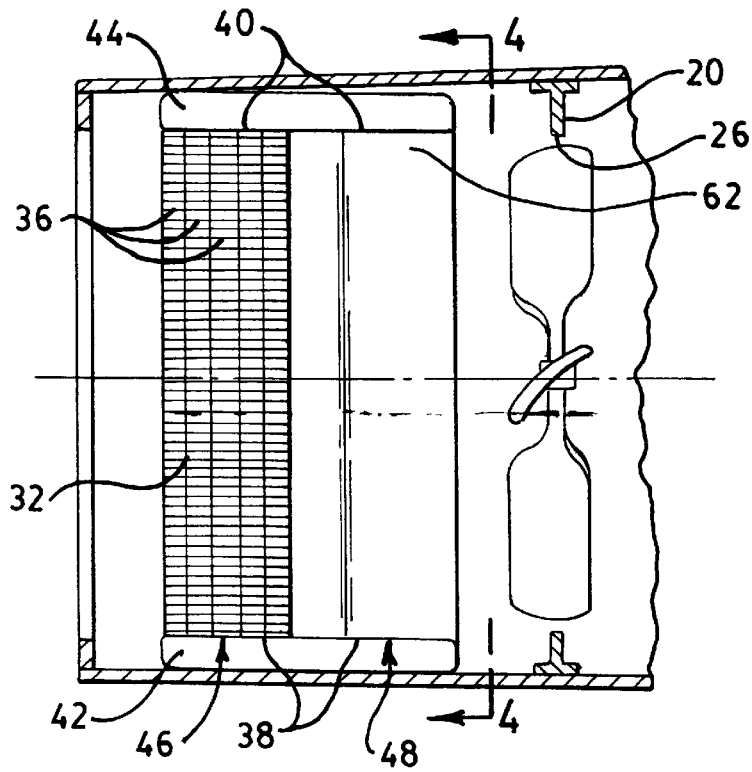
FIG. 3 is a side view taken along lines 3—3 of FIG. 2.
Figure 4:
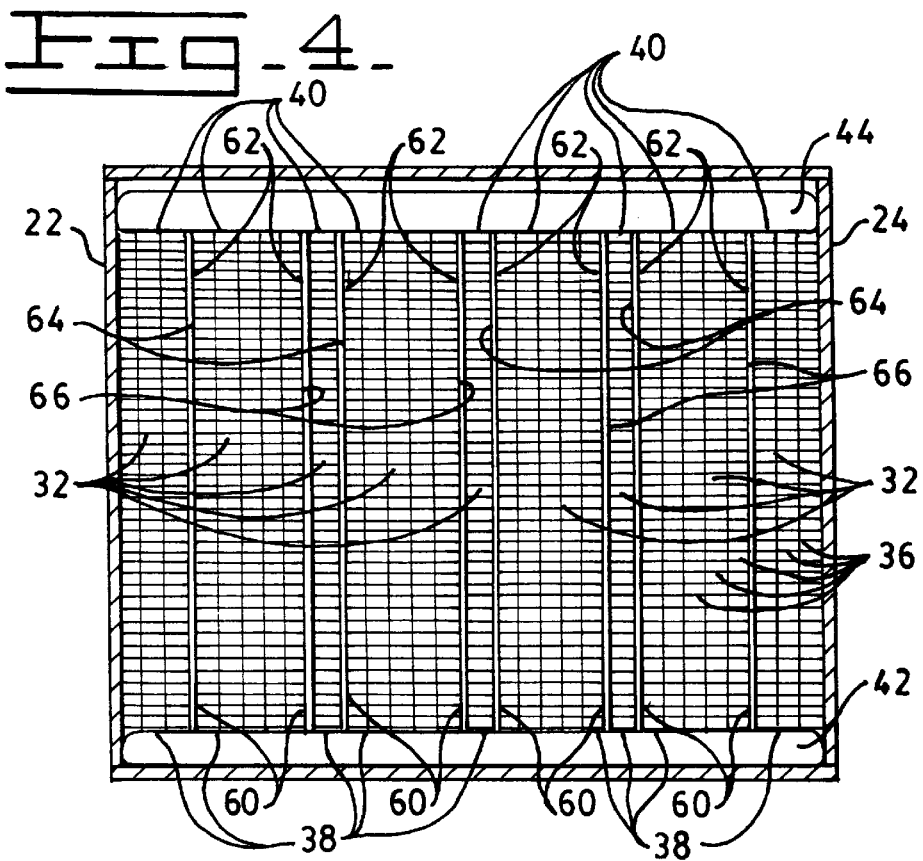
FIG. 4 is a front view taken along lines 4—4 of FIG. 3.

Referring to the drawings of FIGS. 2–4, the modular radiator arrangement 10 has a plurality of elongated radiator core modules 32 each having a plurality of spaced substantially parallel fluid passing tubes 34 and a plurality of spaced substantially parallel fins 36 transversely oriented relative to and connected to the fluid passing tubes. The connection of the fins to the tubes may be in any conventional manner such as by brazing and the like. The tubes are connected to the internal combustion engine 30 and recirculate cooling fluid flow delivered by a coolant pump (not shown) on the engine. Recirculation systems of any conventional suitable type may be used.

The radiator core modules are elongated and have first and second spaced apart end portions 38, 40 and a predetermined length. The first and second end portions 38, 40 of the radiator core modules are connected to first and second spaced apart tanks 42, 44 respectively. It should be noted that other configurations having only a single lower or double tank at one of the first and second end portions may be utilized without departing from the spirit of the invention. Coolant flow from the internal combustion engine 30 is circulated to the first tank 42, through the tubes 34, to the second tank 44 and back to the internal combustion engine 30 in a conventional manner. The modular radiator arrangement 10 is shown as having the radiator core modules 32 elevationally oriented. However, it is to be noted that the core modules could be oriented transversely relative to the first and second side walls 22, 24 of the plenum 14 without departing from the invention.

The modular radiator arrangement 10 has first and second rows of radiator core modules 32. The radiator core modules 32 are substantially parallel to each other, consecutively arranged and is on a plane perpendicular to the side walls 22, 24. The radiator core modules 32 of the first row are spaced a predetermined distance apart and define a first space 50 between each consecutive pair of said modules 32. The radiator core modules 32 of the second row 48 are also spaced a predetermined distance apart and define a second space 52 between consecutive pairs of the radiator core modules of the second row 48.

The second row 48 of radiator core modules 32 are spaced a predetermined distance from the first row 46 of radiator core modules 32 and between the cooling fan 18 and the first row 46 of radiator core modules 32. Each module 32 of the second row 48 of consecutive modules is aligned with a different first space 50 of the first row 46 of radiator core modules 32. In particular, but not necessarily limited to, the center of the first space 50 bisects the width of the radiator core modules 32 of the second row 48 along the length of the radiator core modules 32 of the second row 48.

A plurality of air directing ducts 54 has first and second spaced side walls 56, 58 and first and second spaced end portions 60, 62. The first end portions 60 are connected to the first tank 42 and the second end portions 62 are connected to the second tank 44 each in any suitable manner such as by a suitable mechanical method or by brazing. It is to be noted that connection at only one of the first and second end portions 60, 62 to a respectively adjacent one of the first and second tanks 42, 44 may be utilized. Also in applications having a single tank or two tanks at one of the end portions 60, 62, a flange may be provided to which the radiator core modules 32 are each connected at the end portion 60, 62 opposite the one end portion 60, 62.

An air directing duct 54 is disposed in each of the first spaces 50 and about a radiator core module 32 of the second row 48 of radiator core modules 32 aligned with the most adjacent first space 50. The air directing ducts 54 direct air flow induced by the fan 18 in bypass of the first row 46 of radiator core modules 32 and through the second row 48 of radiator core modules 32. The air directing ducts 32 also directs air flow induced by the fan 18 through the first row 46 of radiator core modules 32 and in bypass of the second row 48 of radiator core modules 32.

The first side walls 56 of the air directing ducts 54 are closely adjacent a second side 66 of the adjacent radiator core modules 32 of the first row 46 of modules 32 and closely adjacent the first side 64 of the adjacent radiator core modules 32 of the second row 48. The second side wall 58 of the air directing ducts 54 are closely adjacent a first side 64 of the adjacent radiator core modules 32 of the first row 46 of modules 32 and closely adjacent the second side 66 of the adjacent second row 48 of radiator core modules 32. The first and second sides 64, 66 of the radiator core modules 32 are defined by opposite ends of the plurality of fins 36. It is to be noted that the first and second side walls 56, 58 of the air directing ducts may be engaged with or connected to the closely adjacent first and second sides 64, 66 of the radiator core modules 32 without departing from the invention.

The predetermined distance between radiator core modules, that is the distance between first and second sides 64, 66 of adjacent modules 32, are preferably substantially equal in magnitude to ensure equal air flow through each radiator core module 32. The first side wall 56 of a first one of the air directing ducts 54 is the first side wall 56 of a second one of the air directing ducts 54 and the second side wall 58 of the first one of the air directing ducts 54 is a second side wall 58 of a third one of the air directing ducts 54. The first and second side walls 56, 58 of the ducts 32 are each formed to provide a smooth transition for air flow at a location between the first and second rows 46, 48.

Industrial Applicability

With reference to the drawings, and in operation, the fan 18 induces cooling air flow to enter the opening at one end 16 of the plenum 14. The cooling air flow is directed by the air directing ducts 54 to pass through the first row 46 of radiator core modules 32 and through the second row 48 of radiator core modules 32. Because of the construction of the air directing ducts 54, cooling air flow through the first row 46 of radiator core modules 32 bypasses the second row of radiator core modules and through the shroud and into the plenum 14 adjacent the engine 30. Similarly, the air directing ducts 54 pass cooling air flow through the second row 48 of radiator core modules 32 and in bypass of the first row 46 of radiator core modules 32 through the circular opening 26 and into the engine compartment. Because the air flow is separated, the cooling air flow delivered to the first and second rows will be at substantially the same temperature. As a result the efficiency of cooling is maximized as both the first and second rows 46, 48 are exposed to the coolest air possible.

The spacing of the radiator core modules 32 of each row 46, 48, the distance between said radiator core modules 32, and the capacity of the fan determines the amount of cooling air flow and amount of heat transfer for a given modular radiator core construction. Thus, the distance between radiator core modules 32 is determined carefully by testing, computer models and the like.

The air directing ducts 54 being connected to one of the first and second tanks 44, 46 and closely adjacent to the first and second sides 64, 66 of the radiator core modules maintains the air directing ducts 54 in position and insures equal distribution of air relative to each of the radiator core modules 32.

Because of the simplicity of connection between the first and second tanks 42, 44 and the air directing ducts 54, the cost and reliability of the modular radiator arrangement 10 is favorable.

Other aspects, objects and advantages of the invention may be obtained from a reading of the specification, claims and drawings.

I claim:

1. A modular radiator arrangement for a work machine comprising:

a fan having a plurality of blades and being rotatable to induce cooling air flow;

a plurality of elongated radiator core modules each having a plurality of spaced substantially parallel fluid passing tubes and a plurality of spaced substantially parallel fins transversely oriented relative to and connected to said fluid passing tubes;

a first row of substantially parallel consecutive radiator core modules, said radiator core modules being spaced a predetermined distance apart and defining a first space between consecutive pairs of said modules;

a second row of substantially parallel consecutive radiator core modules, said radiator core modules of the second row being spaced a predetermined distance apart and defining a second space between consecutive pairs of radiator core modules of the second row, said second row of radiator core modules being located a predetermined spaced distance from the first row of radiator core modules and between the fan and the first row of radiator core modules, each module of the second row of consecutive modules being aligned with a different first space; and an air directing duct is disposed in each of the first spaces and about the radiator core modules of the second row of radiator core modules aligned with the first spaces, said air directing ducts direct airflow induced by the fan in bypass of the first row of radiator core modules and through the second row of radiator core modules and directs air flow induced by the fan through the first row of radiator core modules and in bypass of the second row of radiator core modules.

2. A modular radiator arrangement as set forth in claim 1, wherein said elongated radiator core modules have first and second spaced end portions and a predetermined length, said plurality of air directing ducts extending the length of the radiator core modules.

3. A modular radiator arrangement as set forth in claim 2, including a first tank and said first end portion of the radiator core modules being connected to the first tank.

4. A modular radiator arrangement as set forth in claim 3, including a second tank and such second end portion of the radiator core modules being connected to the second tank.

5. A modular radiator arrangement as set forth in claim 3, wherein said air directing ducts each have first and second spaced end portions and are connected at the first end portion to the first tank.

6. A modular radiator arrangement, as set forth in claim 4, wherein said air directing ducts each have first and second spaced end portions and wherein at least one of the first and second end portions of said air directing ducts is connected to an adjacent one of the first and second tanks.

7. A modular radiator arrangement, as set forth in claim 2, wherein said air directing ducts each have first and second spaced side walls, and said radiator core modules each have spaced apart first and second sides defined by said plurality of fins, said first side wall of the air directing ducts being closely adjacent the second side of the adjacent radiator core modules of the first row of modules and closely adjacent the first side of the adjacent radiator core modules of the second row, said second side wall of the air directing ducts being closely adjacent the first side of the adjacent radiator core modules of the first row of modules and closely adjacent the second side of the adjacent radiator core module of the second row of radiator core modules.

8. A modular radiator arrangement, as set forth in claim 7, wherein said first and second side walls of the air directing ducts are engaged with the closely adjacent first and second sides of the radiator core modules.

9. A modular radiator arrangement, as set forth in claim 7, wherein the predetermined distances defining the first and second spaces are substantially equal in magnitude.

10. A modular radiator arrangement, as set forth in claim 3, wherein said air directing ducts each have first and second side walls, said side wall of a first one of the air directing ducts being the first side wall of a second one of the air directing ducts and the second side wall of said first one of the air directing ducts being a second side wall of a third one of said air directing ducts.

11. A modular radiator arrangement, as set forth in claim 7, including a plenum having spaced apart sides, a top and a bottom connected to said spaced apart sides, said first and second rows of radiator core modules and said fan being disposed in and connected to said plenum.

12. A modular radiator arrangement, as set forth in claim 11, including a fan shroud connected to said plenum and disposed about said fan, said shroud causing fan induced air flow to be drawn through the air directing ducts.

13. A modular radiator arrangement, as set forth in claim 12, wherein said plenum has an open end at the first row of radiator core modules.

14. A modular radiator arrangement, as set forth in claim 13, wherein said plenum is an engine compartment of a work machine.

* * * * *